United States Patent [19]

St. John

[11] Patent Number: 5,064,405

[45] Date of Patent: Nov. 12, 1991

[54] ADJUSTABLE LOCKED CENTER AND DYNAMIC TENSIONER

[76] Inventor: Richard C. St. John, 731 Bachtel St., SE., North Canton, Ohio 44720

[21] Appl. No.: 577,139

[22] Filed: Sep. 4, 1990

Related U.S. Application Data

[62] Division of Ser. No. 383,630, Jul. 24, 1989, Pat. No. 4,957,471.

[51] Int. Cl.[5] .............................................. F16H 7/12
[52] U.S. Cl. ...................................... 474/133; 474/117
[58] Field of Search ........................ 474/101, 109–111, 474/113–117, 133, 135, 136, 138

[56] References Cited

U.S. PATENT DOCUMENTS

| | | | |
|---|---|---|---|
| 4,557,709 | 12/1985 | St. John | 474/117 |
| 4,767,383 | 8/1988 | St. John | 474/133 |
| 4,950,207 | 8/1990 | Henderson | 474/133 |
| 4,957,471 | 9/1990 | St. John | 474/133 |

*Primary Examiner*—Thuy M. Bui
*Attorney, Agent, or Firm*—Reese Taylor

[57] ABSTRACT

An adjustable locked center and dynamic tensioner include both a method for setting tension in a belt or chain drive system and apparatus for setting the friction torque so as to match the system setting torque. The method includes forcing the tensioner against a stable mounting surface with sufficient spring load that a target friction torque will be required to rotate the tensioner. The tensioner arm is then rotated into the belt or chain until, when the setting torque is removed, the belt or chain will counter rotate the tensioner arm and the target friction torque in the tensioner will cause the target setting tension to remain in the system. The apparatus includes a tensioner arm pivotally mounted on a fixed surface with a spring engaging the arm and being clamped against the fixed surface. Modifications include introducing a compliant coupler such as an elastomeric busing or spring between the stable mounting surface and the tensioner arm.

14 Claims, 4 Drawing Sheets

ADJUSTABLE LOCKED CENTER AND DYNAMIC TENSIONER

RELATED PATENT APPLICATIONS

This Application is a divisional application of Applicant's Application filed July 24, 1989, as Ser. No. 383,630 now U.S. Pat. No. 4,957,471.

BACKGROUND OF THE INVENTION

This invention relates, in general, to belt and chain drive tensioners and relates, in particular, to a belt or chain drive tensioner intended to provide for the adjustment of tension in serpentine drive systems.

DESCRIPTION OF THE PRIOR ART

It is known, from St. John U.S. Pat. No. 4,557,709 and others, that power transmission drives, such as serpentine drives, generally require a tensioning device to operate effectively and that a properly positioned pivotal arm, spring-actuated, automatic tensioner will provide functionally constant tension over a broad enough range of operation to last the life of the drive system.

It is also known from the prior art, such as St. John U.S. Pat. No. 4,767,383, that an adjustable tensioner can be employed for much the same purpose, except that periodic adjustments need to be made to compensate for variations in belt length caused by original belt and equipment manufacturing tolerances and belt stretch during use. This art teaches that torque applied about the arm pivot point will cause tension in the belt and that there are well-identified mathematical relationships between the tensioner torque and the belt tension. It has also been demonstrated that practically constant tension can be provided over useful ranges of belt elongation by constant torque applied about the pivot of the tensioner when the tensioner is properly placed in the drive system or, in other words, oriented correctly between the two pulleys that straddle the tensioner.

Classic engineering principles also teach that there will be no fundamental operational difference between a tensioner that employs torque about the pivot to generate the belt tension or one that uses belt tension to generate the torque about the pivot. In other words, it is immaterial whether the tension component is the result of the torque component, or whether the torque component is the result of the tension component.

Automatic tensioners, such as shown in St. John U.S. Pat. No. 4,557,709 and other automatic tensioners, as well as the adjustable tensioner of St. John U.S. Pat. No. 4,767,383, exploit the torque to cause the tension. The present invention, however, exploits the tension acting against the idler pulley of the system to cause the torque.

SUMMARY OF THE INVENTION

It is, accordingly, a principal object of this invention to provide an adjustable tensioner using friction to provide the predetermined torque which matches the system requirements for target tension at any point or over any specified range with specified nominal accuracy.

It is a further object of the invention to use an undefined amount of tensioner spring back after the setting torque is removed as an indication that enough setting torque has been provided and thus permit precise results to be derived from imprecise inputs without the use of measuring devices.

It is a still further object of the invention to permit a friction set device to be initially over-tensioned to compensate for initial excessive belt stretch, but still provide the correct tensioning torque in subsequent tensioning settings.

It is a still further object of the invention to utilize the combination of predetermined and preset tension in conjunction with a compliant torsion bushing to provide a superior and predictable dynamic tensioner.

In accomplishing these objectives, friction means are employed adjacent to the pivot screw of the tensioner to achieve the predetermined torque. It will be noted that the pivot screw is fixed or coupled to the tensioner arm, but free to rotate with respect to the user mount. In essence, a locking nut on the pivot screw is tightened against a member, such as a Belleville spring, until the friction forces between the spring and the nut plus those between the tensioner arm and the user mount are of the correct magnitude to require a given torque value to be applied to the pivot screw to cause the tensioner arm to rotate when it is unconstrained by the belt or any other influence other than the friction torque.

Accordingly, production of an improved adjustable locked center and dynamic tensioner of the character above-described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
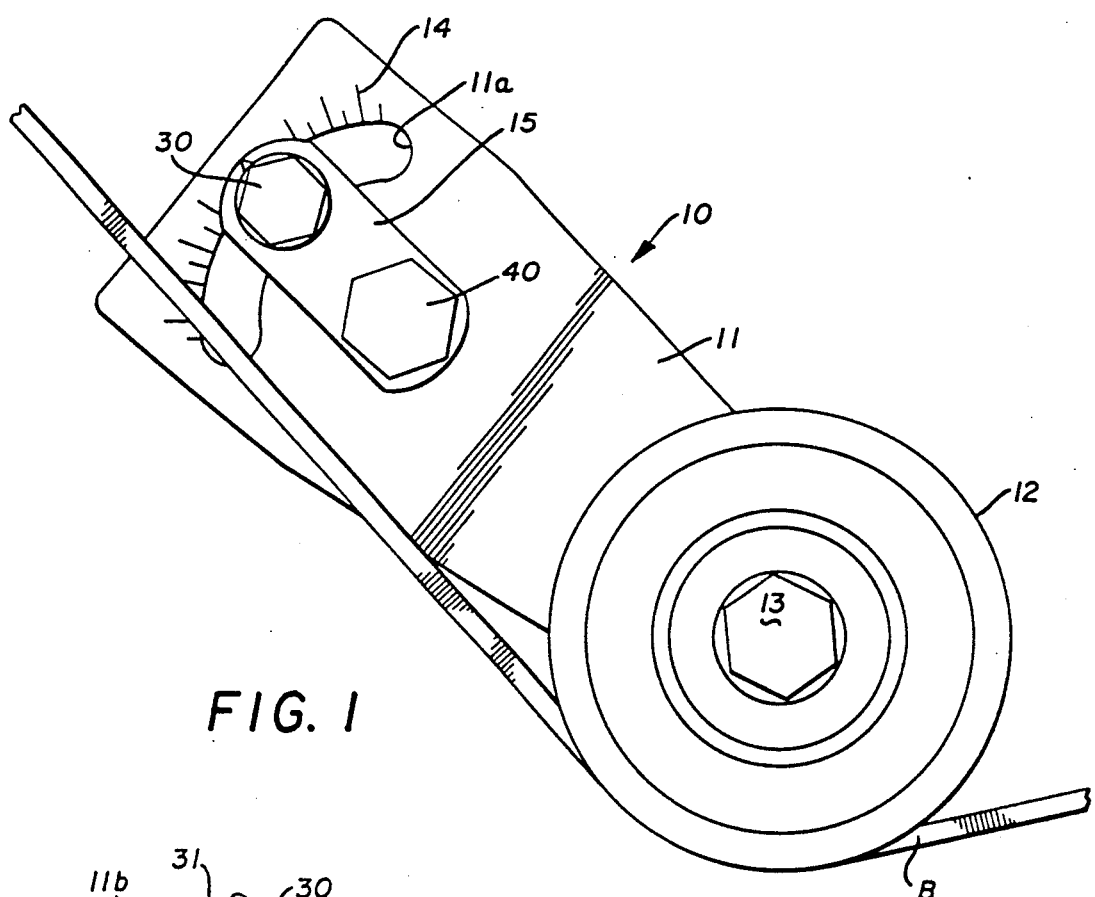
FIG. 1 is a plan view showing one form of the friction set, adjustable tensioner.
Figure 2:
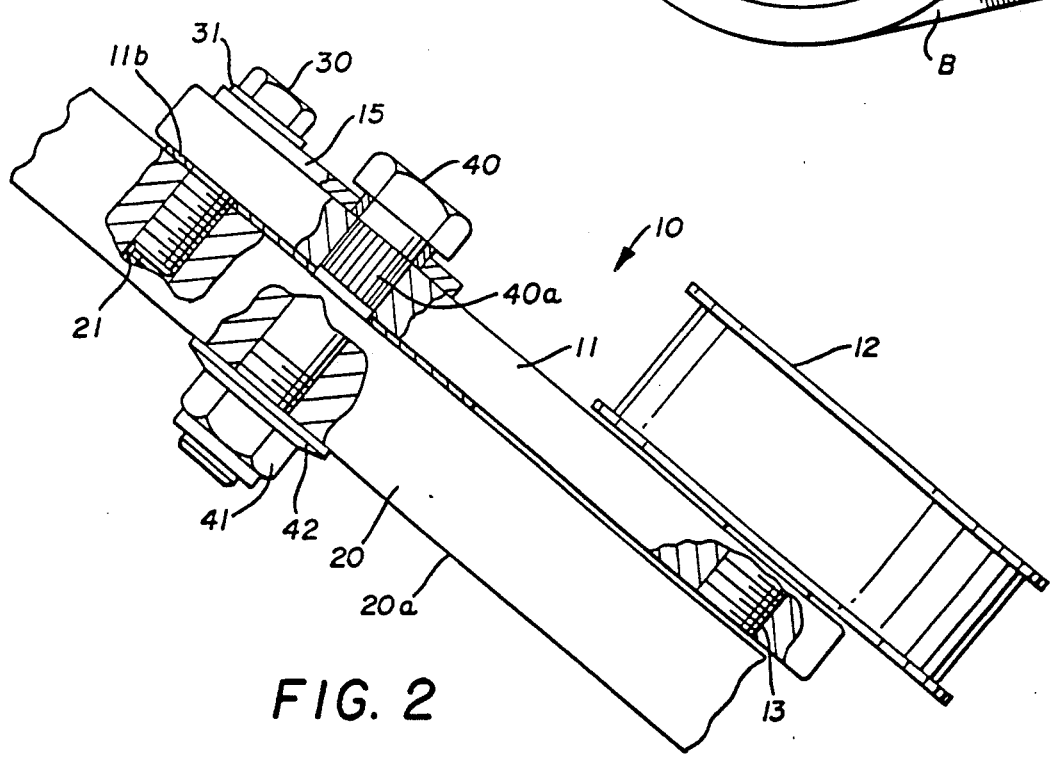
FIG. 2 is an elevational view, partially in section, showing the tensioner of FIG. 1.

Before describing the various embodiments of the present invention in detail, it should first be noted that, in subsequent embodiments after the first embodiment illustrated in FIGS. 1 and 2 of the drawings, similar reference numerals are utilized for similar components, except that the numbers are in the 100, 200, etc., series.

Referring then to FIGS. 1 and 2 of the drawings, it will be seen that the tensioner, generally indicated by the numeral 10, includes a tensioner arm 11, one end of which carries a pulley and bearing assembly 12 mounted thereon by pulley screw 13. It should be noted that the pulley illustrated is of the "flat" type, but many other pulley styles are contemplated.

The opposed end of arm 11 is mounted on user mount 20 which, in practice, can be any stable portion of the drive system, such as an engine block. There are two means for attachment involved for mounting tensioner 10—lock screw 30 and pivot screw 40, as will be described below.

In that regard, a pointer 15 is disposed on the top of arm 11 and lock screw 30 and its associated lock washer 31 are disposed on one end thereof. Lock screw 30 is passed through a suitable aperture in pointer 15, an arcuate slot 11a in arm 11 and is received in a threaded bore 21 in mount 20, as can be seen in FIG. 2.

To enhance performance an enlarged aperture is provided in pointer 15 and a flat washer 32 is inserted in the bore so that the pivot screw clamps on the washer 32 instead of on the pointer 15, as shown in FIG. 2. A flat spacer 11b between the tensioner arm 11 and the user mount 20 can also optionally be employed as illustrated and has been found to be an effective means of insuring constant friction torque when the user mount is rough, wavy or unpredictable.

Pivot screw 40 also passes through suitable apertures or bores, in pointer 15, arm 11 and user mount 20 and projects beyond the bottom surface 20a of user mount 20. The projecting end of pivot screw 40 receives a Belleville spring 42 and a clamping nut 41. The shank of pivot screw 40 is knurled at 40a to key the pivot screw to arm 11. It should be noted that, while a Belleville spring is illustrated and described and is a logical choice in terms of size, cost and ease of mounting, other suitable force means, such as a coil spring or elastomeric pad, could provide the necessary friction torque.

The method of providing the setting torque in FIGS. 1 and 2 is to force the tensioner arm 11 against the user mount 20 with a spring load. When the spring load is of the proper value, the friction torque between the tensioner arm 11 and either the user mount 20 or spacer 11b, if one is used, will be of the proper value to provide the desired static tension in the belt B when the belt acts against the pulley and bearing assembly 12. Once the proper friction value has been established, the static tension is set by rotating the tensioner arm 11 into the belt hard enough so that, when the setting torque is removed, the belt counter-rotates the tensioner. When this backward motion occurs, no matter how slight it may be, the belt will experience the tension that is associated with the friction torque.

Setting the friction torque is generally a one-time operation, but the belt tension may be set many times from the single friction adjustment.

If the torque is applied to the tensioner arm 11 about the pivot screw 40, the minimum value of applied torque to cause impending backward motion will be twice the friction torque. Additional applied torque will simply cause more belt stretch and more spring back after the setting torque is removed, but the retained torque will be the value of the friction torque and the tension in the belt will be the target tension. In actual use, dynamic belt tensions vary from the static tension set into the belt by the means just described. The variation in dynamic tension could cause unwanted motion of the tensioner arm 11 and subsequent loss in static tension if means to prevent this motion were not provided by the lock screw 30.

In operation, the lock screw 30 is tightened to clamp the tensioner arm 11 against the user mount 20 or spacer 11b with a friction torque that is much greater than the setting torque and of a value high enough to resist any torque caused by excursions of dynamic tension.

The method of providing the proper friction torque has been shown as a Belleville spring 42 placed between the fixed surface, such as the user mount 20, and the clamping nut 41. The clamping nut 41 clamps the Belleville spring 42 so that the spring is compressed between the clamping nut 41 and the user mount 20. Rotation of the clamping nut 41 increases or lessens the compression, depending upon the direction of rotation, so judicious rotation of the nut and selection of components can provide any amount of clamping force between friction surfaces. The infinitely variable value of friction force results in infinitely variable friction torque of the adjustable tensioner, so any value of setting torque and consequently belt tension can be had by the means just described.

There are many variations of the friction surfaces and load applying means. For example, a conventional helical compression spring could replace the Belleville spring, the spring compression could be governed by a snap ring with or without shims for adjustment, and a friction disc or multiple friction discs could be placed between the tensioner arm 11 and the user mount 20 in the manner of power transmission clutches. As shown, most of the friction torque is generated between the tensioner arm 11 and the user mount 20 or spacer 11b, although some is generated between the clamping nut 41 and the Belleville spring 42 and the user mount 20.

The theory of providing essentially constant belt tension with a constant torque applied about the pivot screw 40 has been disclosed in U.S. Pat. No. 4,767,383. This same theory applies to setting the friction torque in the friction set adjustable tensioner, i.e., the friction torque must be measured by applying torque about the pivot screw 40. However, once that torque has been so found to be of a satisfactory value, proper tension will be achieved by applying a load to any place on the tensioner. The criteria for successful tensioning are that the tensioner spring back by action of the belt after the tensioning torque is removed and that the tensioning torque not be so great as to unduly damage the belt or other system components.

Although the primary goal of this device is to provide target tension without having to make measurements after the initial friction setting, there are other valuable ways in which the tensioner may be used. One of these is that the friction provision may be used as a biasing means to ease holding net tensioning torque when the friction set device is used as an adjustable tensioner. This is done by measuring the friction torque, adding the tensioning torque to the friction value, applying that torque sum to the pivot screw 40 and then tightening the lock screw 30. The net torque will be the tensioning torque, and the tension in the belt will be that provided by the tensioning torque. If the friction torque is greater than the tensioning torque, the torque wrench may be removed prior to tightening the lock screw 30. If the friction torque is less than the tensioning torque, torque must be held on the pivot screw 40, while the lock screw 30 is being tightened. However, excursions in the holding torque on the pivot screw 40 that are less than the friction torque will not result in any variation in the net tensioning torque or the tension in the belt. Consequently, even serious reductions from the ideal will not impair tension once the proper tensioning torque has been reached.

Most belt manufacturers recommend that the initial belt tension be adjusted to between 50% and 100% greater than the normal operating tension. The high initial tension is used because new belts stretch very rapidly for a short period, then stretch much more slowly and regularly for the balance of their life. The method described in the previous paragraph is very useful in providing the one-time high initial tension, and then sustaining the optimum tensioning torque for the balance of the life of the belt with a minimum number of adjustments. The method is especially useful for original equipment manufacturers who seek belt life that matches the life of the equipment.

Figure 7:
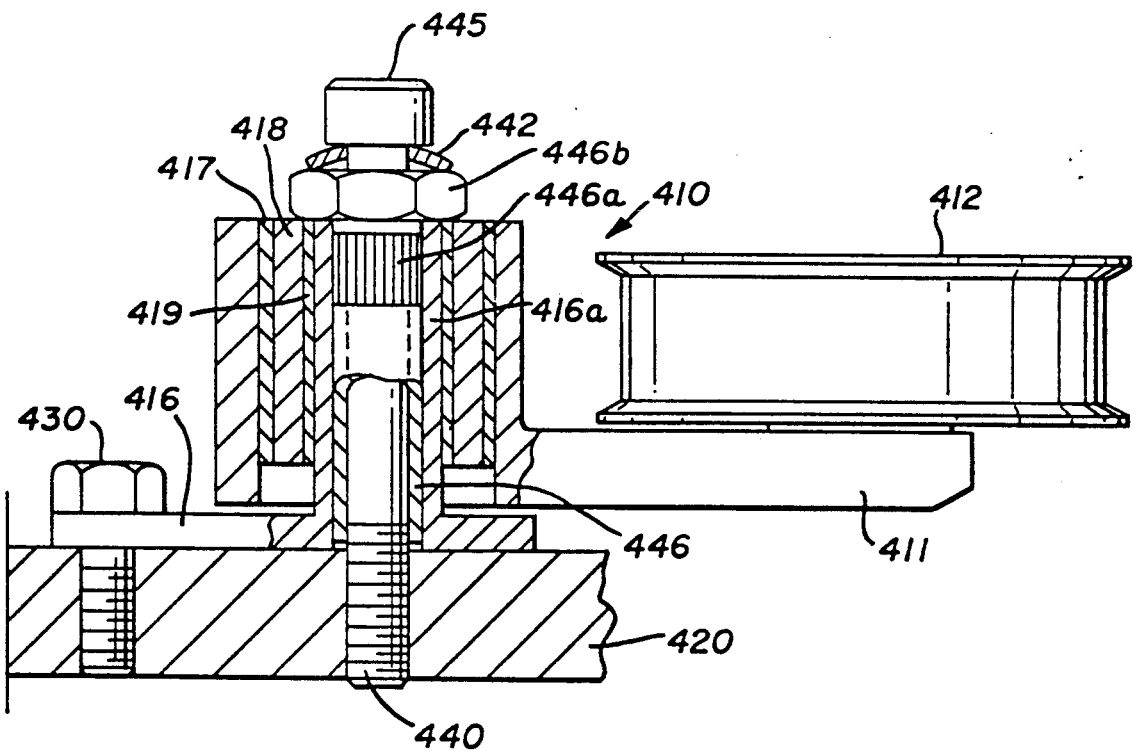
FIG. 7 is an elevational view of a still further modified form of the invention.

The angle markings 14 on arm 11 are almost imperative on tensioners that are used with drives that either have non-linear torque/tension relationships, or lack definition of the region of linearity. In many drives, sufficient analysis has probably been done to identify satisfactory torque/tension relationships, and only two angle markings, such as shown in FIG. 7, need be provided to identify the end conditions. The end conditions and markings indicate:

1. That a newly installed belt is long enough to provide acceptable tension when the specified torque value is applied.
   a. If the belt is too short, excessive tension will normally be encountered unless the condition has been analyzed to meet the high initial tension requirements mentioned in the previous paragraph. Such an analysis should be within the capability of a highly skilled analyst given enough input data.
   b. If the belt is too long, useful belt life can be lost because the user will see the extra length as an indication of belt stretch which is an indication of diminished remaining life.
2. That belt stretch has met the belt manufacturer's recommended value for remaining life, or that the belt is at the limit of the specified region of torque/tension linearity.

Figure 3:
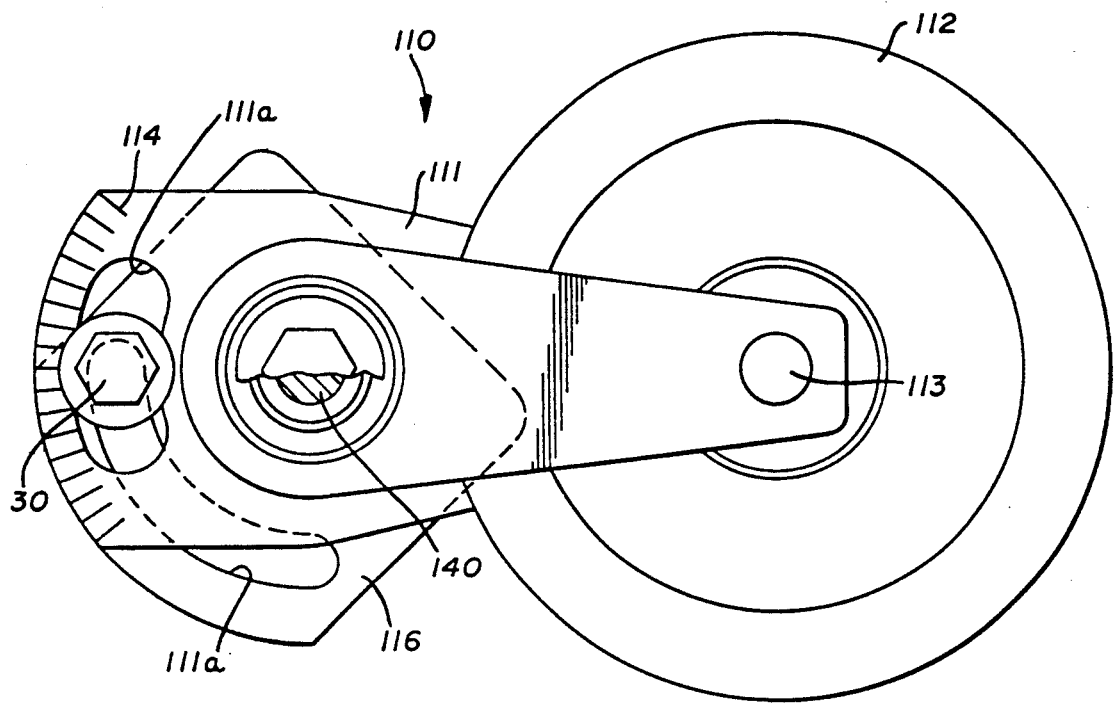
FIG. 3 is a plan view of a friction set, dynamic adjustable tensioner.
Figure 4:
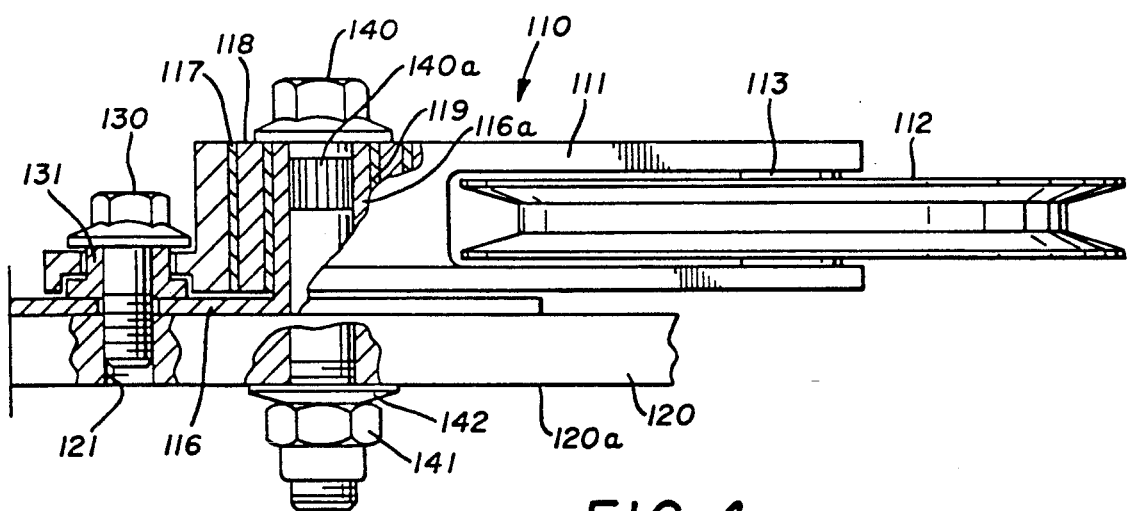
FIG. 4 is an elevational view, partially in section, of the tensioner of FIG. 3.

The compliant, friction set, adjustable tensioner, as depicted by FIGS. 3 and 4, is a dynamic tensioner that offers all of the advantages of adjustable tensioners and many of the advantages of automatic tensioners. Although there are similarities between the devices illustrated in FIGS. 3 and 4 and torsion biased products that are on the market today, the mathematical, construction, and application techniques of the device of FIGS. 3 and 4 make them unique both in concept and use.

In the embodiment of the invention illustrated in FIGS. 3 and 4, the tensioner is generally indicated by the numeral 110 and includes an arm 111 and a pulley and bearing assembly 112 secured to one end thereof by pulley screw 113. It will be noted that the end of the arm 111 which carries the pulley is bifurcated in this embodiment.

As is the case with the embodiment of FIGS. 1 and 2, the tensioner is attached to user mount 120 by lock screw 130 and pivot screw 140. There are, however, significant structural differences.

Thus, lock screw 130 passes through an arcuate slot 111a in an end of arm 111 and a torque plate 116 and is then received in a threaded bore 121 in user mount 120. The shank of lock screw 130 is received in a spacer 131, as can be seen in FIG. 4.

The arm 111 also carries an elastomeric bushing through which the pivot screw projects. It will be noted that torque plate 116 has an upwardly extending cylindrical extension 116a which is surrounded by this bushing. The bushing includes an outer sleeve 117, an inner sleeve 119, adjacent the cylindrical projection 116a of torque plate 116 and bonded or otherwise affixed thereto, and an elastomeric sleeve 118 therebetween.

As is the case in FIGS. 1 and 2, the pivot screw 140 projects beyond the lower surface 120a of user mount 120 and receives Belleville spring 142 and clamping nut 141. Also, the shank of pivot screw 140 is knurled as at 140a so as to prevent inner sleeve 119 from rotating with respect to the pivot screw.

In this family of tensioners, the tensioning torque is set by tightening the clamping nut 141 down on the Belleville spring 142 until the friction torque, as measured by a torquing device that rotates the pivot screw 140, is of a magnitude that will provide the desired belt tension when the belt acts against the pulley and bearing assembly 112, just as with the tensioner of FIGS. 1 and 2. However, the compliant device places the elastomeric torsion bushing 118 between the torque plate 116 to which the pivot screw 140 is fixed and the tensioner arm 111 to which the pulley and bearing assembly 112 is attached, and through which the belt reaction force must act. The elastomeric torsion bushing consists, as noted, of the outer sleeve 117, the inner sleeve 119, and the elastomer 118 which is bonded between the two. This torsion bushing performs a number of functions, the most important of which are:

1. It permits some rotation along with an appropriate restoring torque between the tensioner arm 111 and the torque plate 116 to minimize the effect on belt tension caused by variations in load on the pulley and in belt length.
2. It prevents rubbing of parts at the tensioner pivot axis, and consequently eliminates mechanical wear at this crucial point.
3. It provides some viscous damping because of the high hysteresis properties of most elastomeric materials.

This action of the torsion bushing, in conjunction with the precision initial torque setting of the compliant, friction set, adjsutable tensioner, permits the device to perform most of the functions of automatic tensioners. This statement is based upon a rather extensive computer-aided investigation of serpentine drives in which, within cycle variations in belt tension due to torsional vibrations, acceleration loads, component loads, and tensioner damping were considered. Although the adjustable tensioner did not compensate as well for long-term belt stretch, it was generally superior in its response to oscillating conditions and could generally respond as well or better to variations in dynamic load due to prime mover acceleration and variations in driven component loads. Consequently, it offers significant advantages in maintaining tension under a wide range of conditions while eliminating the serious problem of pivot wear in systems that will receive enough routine maintenance to insure the simple tensioning procedure previously described. This procedure may amount to loosening the lock screw 130, rotating the tensioner arm 111 into the belt until it springs back, and re-tightening the lock screw 130 once every 20,000 or 50,000 miles in some automotive applications, or the equivalent in stationary and marine applications.

Angle markings 14 and 114 are shown in FIGS. 1 and 3; however, they are really needed only to denote minimum, maximum, and possibly intermediate arm angles that are associated with key belt lengths. These angles are actually relationships between the user mounts 20 and 120 and the tensioner arms 11 and 111. Relative motion between the torque plate 116 and the tensioner arm 111, or the torque plate 116 and the lock screw 130, complicates using these relationships as indicators of arm angle, but they can be used satisfactorily if enough is known about the stress/strain relationships of the torsion bushing. In general, however, either an indicator that is functionally similar to the pointer 15 shown in FIG. 1, or markings on the tensioner arm 111 shown in FIG. 3 that can be related to the lock screw 130, will suffice. The markings can be as shown by angle markings 14, or simply marks (not shown) on the outside of the tensioner arm 111.

The particularly significant features of the compliant, friction set, adjustable tensioner of FIGS. 3 and 4 are:
1. The torque plate which allows the setting torque supplied by the friction mechanism to be applied directly to the torsion bushing which transmits that precise amount of torque to the tensioner body to provide the target tension in the belt.
2. The mechanism to set predetermined tensioning torques that will insure the proper belt tension.
3. The various arrangements that are illustrated to exploit the capabilities of the device.

Thus, FIGS. 3 and 4 depict a compliant, friction set, adjustable tensioner that has a simply supported pulley and bearing assembly 112 mounted between the bifurcated arms of the tensioner arm 111, as previously noted. It should be noted that the pulley and bearing assembly 112 are mounted symmetrically to the torsion bushing to help insure that the line of action of the belt reaction force loads the torsion bushing symmetrically. The symmetric loading is generally necessary to insure that the compliant torsion bushing does not deflect and cause the belt to become misaligned from the belt path that is established by the two pulleys that straddle the tensioner. This requirement holds true for all tensioner configurations.

Still referring to FIGS. 3 and 4, the mounting that is shown is typical of an actual application. Generally, the tensioner requirements are determined prior to installation. The key elements of this determination are the location of the tensioner in the system to provide the constant torque/tension relationship and the amount of torque necessary to yield the desired tension. When the tensioner is originally installed, the clamping nut 141 is tightened down on the Belleville spring 142 until the friction torque applied to the pivot screw 140 to rotate the unrestrained torque plate 116 and tensioner arm 111 together is equal to the previously determined torque that will provide the target tension. This is a requirement for all configurations, and when this is done, the tensioner is ready to be used to apply tension to the belt.

The next step is to loosen the lock screw 130 and rotate the torque plate 116 clockwise until the spring back of the tensioner arm 111 is observed after the setting torque is removed. Observation of these two components will reveal that there is relative motion between them as the pulley and bearing assembly 112 contacts the belt, torque continues to be applied to the torque plate 116, and relative rotation between the inner sleeve 119 and the outer sleeve 117 occurs as shear stresses are generated in the elastomer 118 of the torsion bushing. The shear stresses are sustained because the pivot screw 140 is effectively fixed to the inner sleeve 119, and the outer sleeve 117 is effectively fixed to the tensioner arm 111. Although transmission of the setting torque through the pivot screw 140 is not required, it is generally convenient.

The lock screw 130 is next tightened down to clamp the torque plate 116 between the spacer 131 and the user mount 120 so that no rotation of the torque plate 116 can occur until the lock screw 130 is intentionally loosened during some subsequent operation. The spacer 131 is long enough to insure that the tensioner arm 111 is not clamped to the torque plate 116 so that the tensioner arm 111 can rotate to respond to varying belt tension and length conditions. When the tensioner is viewed in plan, the torque plate 116 and the tensioner arm 111 will both be rotated clockwise, but the torque plate 116 will have rotated further. Consequently, the lock screw 130 will no longer appear to be symmetrically located in the arcuate cutout 111a in the tensioner arm 111 because the tensioner arm 111 will be displaced so the bottom edge of the cutout will be nearer the screw. The spring rate of the torsion bushing will have been chosen so that the full anticipated torque of the system will not cause the tensioner arm 111 to touch the spacer 131, except possibly when it is desired to over-tension the belt in keeping with the manufacturer's recommendations when the belt is new. In such a case, the tensioner arm 111 can stop against the spacer 131 and some or all of the excess tensioning torque will be absorbed by the lock screw 130 to avoid over-stressing the torsion bushing.

When the tensioner is positioned and torqued as just described, it is ready to perform the tensioning task for which it was intended, and need only receive periodic adjustment to maintain suitable tension for the life of the belt. This adjustment, as before, consists only of loosening the lock screw 130, rotating the torque plate 116 by turning the pivot screw 140 until the tensioner arm 111 springs back when the torque is removed, and finally re-tightening the lock screw 130.

Some contend that an automatic belt tensioner must be positioned in the belt strand of a multiple pulley system, such as a serpentine drive that has the dynamic tension requirement that most nearly approaches the static tension of the system. Actually, the static tension of the conventional locked center system has little real meaning to a system with an automatic tensioner that has a suitable response to tension oscillations. The nature of belt drives is such that low tensions near the low tension side of the prime mover generate the necessary higher tensions as each driven component comes closer to the high tension side of the prime mover. This is in keeping with the nature of belt and chain drives which is that the tension is greater on the entering side of the prime mover that pulls the belt or chain, and is at the lowest on the exiting side of the prime mover. An additional natural characteristic is that the maximum tension is the minimum tension plus the sum of the tension increments required to drive each of the driven components in the system. For example, if the tension in the belt as it exits the prime mover pulley is 100 Newtons and there are five driven components, two of which require tension differentials of 50 Newtons, one that requires a tension differential of 150 Newtons, and two that require tension differentials of 75 Newtons, the maximum tension in the belt as it enters the prime mover pulley will be [100+(50+50+150+75+75)]=500 Newtons. When dealing with the locked center tensioner of FIG. 1, it is necessary to set the static tension in the system such that it is equal to or greater than one half of the sum of the operating tensions that enter and exit the prime mover so the static tension in each span of the example is 300 Newtons when the system is at rest. Furthermore, the tension in each span is the sum of the tension in the preceding span plus the incremental tension about the last pulley. This is demonstrated by the following table of incremental tension about each pulley and the tension in each span of the example. The prime mover pulley is Pulley 0.

| Span No. | Tension | Pulley No. | Tension |
|---|---|---|---|
| 0-1 | 100 | 1 | 50 |
| 1-2 | 150 | 2 | 50 |
| 2-3 | 200 | 3 | 150 |
| 3-4 | 350 | 4 | 75 |
| 4-5 | 425 | 5 | 75 |
| 5-0 | 500 | 0 | 400 |

Keeping in mind that the incremental tensions about each pulley are requirements of the driven components and that the capability of the belt/pulley interface is a separate engineering problem, and the belt mechanics discussed in the previous paragraph, it is obvious that the tensions in the operating system are much different in the non-rotating situation than in the rotating situation. In review, the tension in each strand is the static tension (300N in the example) in the non-rotating situation and there is no tension variation as the belt rounds the pulley. In the rotating system, the tension generally varies from strand to strand by the amount of the incremental tension in each pulley that precedes the strand. It becomes intuitively obvious that, as long as the tension in any single strand is kept at the operating tension required in that strand, the drive system will perform correctly. This last statement is one of the fundamental keys to successful automatic tensioners, although it appears to be lacking in the patent literature. This statement is true even though the non-rotating static tension is only a fraction of the static tension required for the fixed center system. If this is extended to the example, and we consider the locked center condition versus an automatic tensioner in Strand 1-2, we have the following static tensions in the non-rotating condition:

Locked Center Static Tension=300N.

Automatic Tensioner Static Tension=150N.

Although the example and the text consider only a simplified multiple pulley drive system, they identify one of the primary advantages of and one of the most important inherent characteristics of dynamic tensioners.

There are two key features that any successful spring operated, pivotal arm automatic tensioner must possess, and that is the ability to provide the proper torque to maintain the desired belt tension over a broad range of belt length conditions. Given the inherent decay of spring torque with angular displacement, the tensioner must be positioned within the system to match its torque output with the tension requirements of the system. This is often done by specifying 1) a nominal torque at a reference angular displacement, and 2) a spring rate that causes spring torque decay to almost exactly match the requirements of the system as the tensioner is 3) positioned in the system. There are three very important concepts here that have direct analogs in the complaint, friction set, adjustable tensioner concept, and they are:

1. Nominal torque. This is directly analogous to the friction torque set into the adjustable tensioner.
2. Spring Rate. A non-zero number for the automatic tensioner that varies from application to application, but it is always zero for the optimally applied, friction set adjustable tensioner, regardless of the application.
3. Position. The automatic tensioner must be positioned so the system requires tensioner torque that varies as the tensioner can provide. The adjustable tensioner must be positioned so that the system requires essentially constant tensioner torque.

From the preceding, it is apparent to one skilled in the behavior of multiple pulley belt systems that the compliant, friction set, adjustable tensioner will provide all of the features of an automatic tensioner, except its ability to compensate for belt stretch without tension decay. The way around this shortcoming is to set the friction torque a little high, allow the tension to decay a little below the desired value, and re-tension the drive periodically as previously described. The re-tensioning periods can be quite protracted given the current availability of "high modulus" belts. This practice is in keeping with accepted belt tensioning practice. Furthermore, tests indicate that good friction setting practice will provide practical "little high" and "little low" values that are within the nominal tensioning tolerance of spring driven automatic tensioners. Tensioning tolerances of spring driven automatic tensioners are rarely less than $+/-10\%$.

The last issue regarding the relationships between automatic and compliant, friction set, adjustable tensioners are their ability to perform as dynamic tensioners. Here, the term dyanmic tensioner refers to the dynamic tensioners. Here, the term dynamic tensioner refers to the ability to respond to torsional vibrations from all sources in the drive system. It is very desirable for the tensioner to be able to respond to high frequencies and maintain target tension. The more closely the target tension is maintained, the more satisfactory the tensioner is as a dynamic tensioner. The ability of the tensioner to perform the dynamic function is related to the tensioner's natural frequency which, in turn, is related to the spring rate and the moment of inertia of the tensioner; in fact, the relationship is f equals the square root of the quotient (k/j) where f is defined as frequency, k is defined as spring rate, and j is defined as moment of inertia. The following discussion of spring rate and moment of inertia point out why the compliant, friction set adjustable tensioner, has a higher natural frequency than the automatic tensioner and, therefore, is a superior dynamic tensioner.

1. Spring Rate. The spring rate in this context refers to the rapidity with which the tensioner will return to its original position if temporarily displaced by a disruptive force which is then removed. The spring rate of the Automatic Tensioner is the spring rate that is used to compensate for changes in belt length. Typical values of spring rate and torque in automotive applications are $k=150$ Nm/Rev. when the torque is $M=36$ Nm. The compliant, friction set, adjustable tensioner will characteristically be wound about 1/15 revolution to arrive at nominal torque. It's restoring torque to angle relationship would be roughly analogous to a spring rate of $k=T/R=36/(1/15)=540$ Nm/Rev., or 3.6 times the rate of the comparable Automatic Tensioner.
2. Moment of Inertia. The moment of inertia concerns the distribution of mass about the axis of rotation. The major contributor to the moment of inertia of all tensioners is the pulley; however, replacing a 300 to 800 gram spring and extra housing with 100 grams of torsion bushing is a contribution in a region where contributions are very hard to find. A reduction of 5 to 10% in moment of inertia is realistic.

3. Natural Frequency. The preceding terms show significant improvements in natural frequency. A conventional automatic tensioner, as just described, will typically have a natural frequency of 15 Hz., so the compliant, friction set, adjustable tensioner, also just described, will have a natural frequency of 15 multiplied by the square root of $[(540/150)*(1.075/1)] = 29.5$ Hz., almost double that of the automatic tensioner.

The preceding example demonstrates that the compliant, friction set, adjustable tensioner is an inherently superior dynamic tensioner.

All of the details discussed regarding FIGS. 3 and 4, belt mechanics, dynamic tensioning, and comparisons with automatic tensioners hold for the following discussion of some of the many workable variations of the compliant, friction set, adjustable tensioner.

Figure 5:
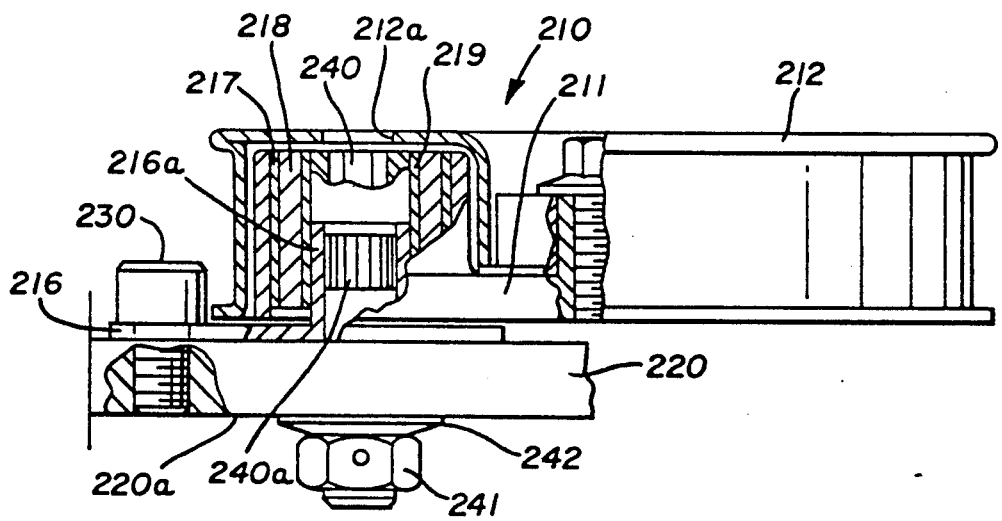
FIG. 5 is an elevational view, partially in section, of a further modified form of an adjustable dynamic tensioner.

FIG. 5 depicts a compliant, friction set, adjustable tensioner that is intended to compensate for relatively little belt take-up (the short tensioner arm length), minimum reverse bending stress in the belt (large diameter pulley), and minimum room overall (no tensioner body 211 protrusion for angle markings).

Again, the tensioner is generally indicated by the numeral 210 and includes a tensioner arm or body 211 and a pulley and bearing assembly 212 mounted on one end thereof.

A lock screw 230 and pivot screw 240 are also provided for attachment of the tensioner 210 to the user mount 220. Also, as was the case with the embodiment of FIGS. 3 and 4, a torque plate 216 having an upwardly extending cylindrical projection 216a is disposed between the tensioner 210 and user mount 220.

Here, the pivot screw extends beneath the lower surface 220a of user mount 220 and receives Belleville spring 242 and clamping nut 241.

An elastomeric bushing similar to that illustrated in FIG. 4 is also provided and includes outer and inner sleeves 217 and 219 with elastomer 218 therebetween. This bushing functions as previously described. That is, the inner sleeve 219 of the bushing is pressed over, bonded to or otherwise affixed to the cylindrical projection 216a. The knurled portion 240a of pivot screw 240 is pressed into or otherwise affixed to the inside of projection 216a.

Torque for both friction setting and tensioning is best provided by rotating the pivot screw 240 by inserting the appropriate wrench through the hole 212a shown in the face of the pulley. General manufacturing practice would require at least two holes in the pulley to eliminate pulley imbalance during routine high speed rotation.

Figure 6:
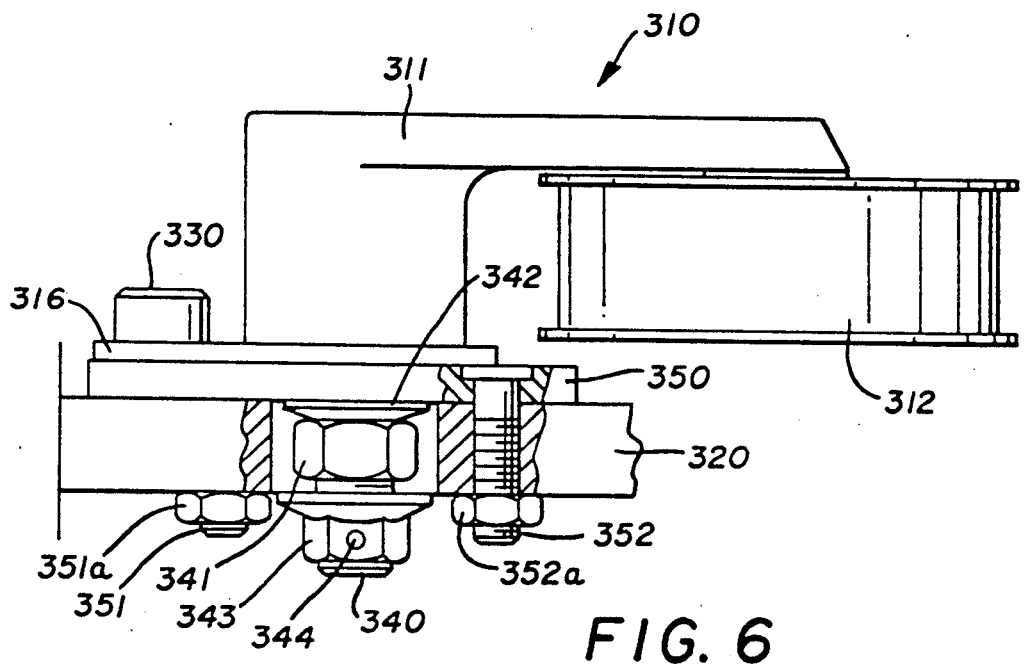
FIG. 6 is an elevational view, partially in plan, showing a still further modified form of the dynamic adjustable tensioner.

FIG. 6 depicts a further version of the tensioner. Again, the tensioner is generally indicated by the numeral 310 and includes a tensioner arm or body 311 with a pulley and bearing assembly 312 mounted on one end.

A lock screw 330 and pivot screw 340 are also provided for mounting the tensioner on user mount 320. Also, as in the FIGS. 3 and 4 embodiment, a torque plate 316 is employed between the tensioner arm or body 311 and the user mount 320.

Here, the Belleville spring 342 bears against base plate 350 when clamping nut 341 is tightened.

In this configuration, the base plate 350 with studs 351 and 352 is provided to permit a tensioner that has had the friction torque adjusted prior to installation in the final application. After the friction torque has been set, the pivot screw 340 and the studs 351 and 352 are inserted in the hole pattern provided by the user in the user mount 320, and nuts 351a and 352a are added, as required, to retain the tensioner. The installer then simply loosens the lock screw 330 and rotates the tensioner into the belt until spring back is observed, or a torque wrench placed on the flanged nut 343 is torqued to the proper value. The lock pin 344 in the flanged nut 343 serves the dual purpose of preventing users from having access to the clamping nut 341 and resetting the preset friction torque, and to insure that the flanged nut 343 does not rotate during field use. Such an arrangement is especially useful when trained operators in a factory with precision tools and extensive equipment can set the friction torque very accurately and rapidly. Relatively untrained operators and users can thus be prevented from changing the friction torque but can still apply the tensioner without worrying about setting measurements. All of this leads to reduced manufacturing and warranty costs for the manufacturer who uses the tensioners on his end product.

Relatively minor modifications to FIG. 6 would place the hex head of the pivot screw 340 on the other end of the tensioner and permit screws that were threaded into the user mount 320 to hold the base plate and the tensioner in position. This would permit access to the tensioner from the same side of the user mount 320 as the tensioner is mounted to provide easy access for tensioning in some cases, and deny access to the clamping nut 341 to operators and the end user. Conversely, the lock screw 330 could be tightened by placing a nut on the same side of the user mount 320 as the flanged nut 343 and the stud nuts 351a and 352a as shown.

Figure 8:
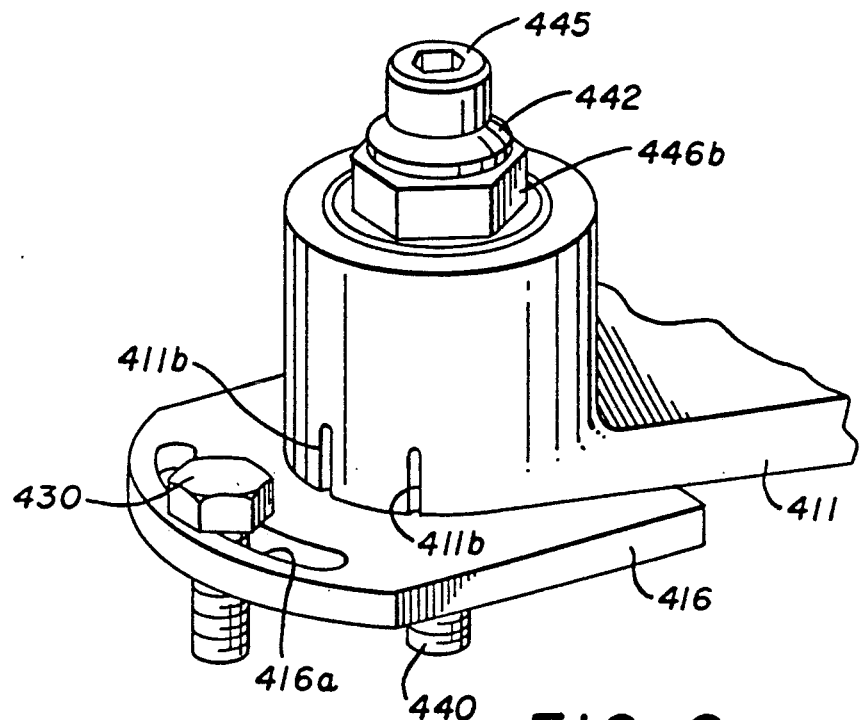
FIG. 8 is a partial perspective view of the form of the invention illustrated in FIG. 7.

FIGS. 7 and 8 show how markings 411b can be made on the outside of the tensioner body 411 when no scale and/or pointer is provided, and illustrate an arrangement for permitting friction setting, locking, and tension setting from the same side of the tensioner. This is very useful when the tensioner must be mounted against existing fixed surfaces, or in new designs where access to both sides of the user mount cannot be readily provided. It will be noted that in all of the modifications illustrated in FIGS. 3 through 8, the torsion bushing is configured symmetrically to the projected face of the pulley to insure that the pulley remains true to the nominal belt path.

In FIGS. 7 and 8, the tensioner is generally indicated by the numeral 410 and includes the tensioner arm or body 411 and the pulley and bearing assembly 412.

Similarly, lock screw 430 and pivot or setting screw 445 are provided for attachment to user mount 420. In this instance pivot screw 440, which has a socket head 445, is merely threaded into user mount 420 and secured by a mechanical or chemical locking assist. A hex head shaft 446 is also provided. This shaft 446 surrounds screw 440 and is knurled at 446a for engagement with the torque plate 416 and ultimately the bushing.

In that regard, the bushing includes inner and outer sleeves 417 and 419 and an elastomeric sleeve 418 therebetween and the torque plate 416 includes an upwardly directed cylindrical projection 416a which engages the knurled area 446a on the hex head shaft 446 and is affixed to the inner sleeve 417 of the bushing.

The Belleville spring 442 and tension setting hexagon head 446b are received on the side of the tensioner opposite torque plate 416 and user mount 420 in this instance. The socket head pivot screw 445 is used for setting friction torque and it will be noted that the friction means, in the form of spring 442, will be trapped between the head 445 and the head 446b.

The unique features of these devices are:
1. Using friction to provide the predetermined torque that matches the system requirements for target tension at any point, or over a specified range with specified nominal accuracy.
2. Using an undefined amount of tensioner spring back after the setting torque is removed as an indication that enough setting torque has been provided to eliminate the need for measuring devices and permitting precise results to be derived from very imprecise inputs.
3. Permitting the friction set device to be initially overtensioned to compensate for initial excessive belt stretch, but still provide the correct tensioning torque in subsequent tension settings.
4. Using the combination of predetermined and preset tension in conjunction with the compliant torsion bushing to provide a superior and predictable dynamic tensioner.

While a full and complete description of the invention has been set forth in accordance with the dictates of the Patent Statutes, it should be understood that modifications can be resorted to without departing from the spirit hereof or the scope of the appended claims.

Thus, in several modifications of the invention illustrated herein, elastomeric bushings have been illustrated and described. It will be understood that other compliant means such as springs could be substituted. While bushings are thought to give superior dynamic response because of their relatively high rates and freedom from sliding surfaces, in suitable circumstances springs may serve equally well.

What is claimed is:
1. A tensioner for setting tension in a belt or chain drive system and adapted for mounting on a stable portion of the drive system, comprising:
   a) an elongate tensioner arm having first and second ends;
   b) a pulley received on said first end of said arm;
   c) a pivot engagable with said second end of said arm and the stable portion of the drive system;
   d) friction means disposed about said pivot and in engagement with said arm, said friction means being compressible to apply clamping force between said arm and the stable portion of the drive system;
   e) locking means for locking said arm relative to the stable portion of the drive system;
   f) a base plate received on the stable portion of the drive system; and
   g) a torque plate received on said base plate between said base plate and said tensioner arm.

2. The tensioner of claim 1 wherein at least one stud is provided for interconnection of said base plate and the stable portion of the drive system.

3. The tensioner of claim 1 wherein a lock screw is provided for interconnection of said torque plate and said base plate.

4. The tensioner of claim 1 wherein said friction means include a spring.

5. The tensioner of claim 1 wherein said pivot comprises a pivot screw having first and second ends; and said locking means comprise a first locking nut received inboard of said second end of said screw and forcing said friction means into engagement with said base plate.

6. The tensioner of claim 5 wherein a flanged nut is received on said second end of said pivot screw; and a radially extending lock pin is attached thereto to secure said nut to said pivot screw.

7. A tensioner for setting tension in a belt or chain drive system and adapted for mounting on a stable portion of the drive system, comprising:
   a) an elongate tensioner arm having first and second ends;
   b) a pulley received on said first end of said arm;
   c) a pivot engagable with said second end of said arm and the stable portion of the drive system;
   d) friction means disposed about said pivot and in engagement with said arm, said friction means being compressible to apply clamping force between said arm and the stable portion of the drive system;
   e) a base plate received on the stable portion of the drive system; and
   f) locking means for locking said arm relative to the stable portion of the drive system.

8. The tensioner of claim 7 wherein said friction means include a spring.

9. The tensioner of claim 7 wherein said second end of said arm includes angle indicating indicia on its outer surface.

10. The tensioner of claim 7 wherein compliant means are disposed about said pivot.

11. The tensioner of claim 10 wherein said compliant means include elastomeric bushing.

12. The tensioner of claim 11 wherein said bushing includes concentric inner and outer sleeves and an elastomeric sleeve therebetween.

13. The tensioner of claim 10 wherein said pivot is knurled for engagement with said compliant means.

14. The tensioner of claim 7 wherein a spacer is disposed between said base plate and said tensioner arm.

* * * * *

UNITED STATES PATENT AND TRADEMARK OFFICE
CERTIFICATE OF CORRECTION

PATENT NO. : 5,064,405

DATED : November 12, 1991

INVENTOR(S) : Richard C. St. John

It is certified that error appears in the above-identified patent and that said Letters Patent is hereby corrected as shown below:

"ABSTRACT," line 17, delete "busing" and substitute therefor --bushing--.

In column 6, line 40, delete "adjsutable" and substitute therefor --adjustable--.

In Column 9, line 66-67, delete "complaint" and substitute therefor --compliant--.

In Column 10, lines 33-34, delete the sentence "Here, the term dynamic tensioner refers to the dynamic tensioners."

In Column 10, line 35, between the words "the" and "ability," insert --tensioner's--.

Signed and Sealed this

Ninth Day of March, 1993

Attest:

STEPHEN G. KUNIN

*Attesting Officer*   *Acting Commissioner of Patents and Trademarks*